US009001539B2

(12) United States Patent
Oh

(10) Patent No.: US 9,001,539 B2
(45) Date of Patent: Apr. 7, 2015

(54) AC-DC RESONANT CONVERTER THAT PROVIDES HIGH EFFICIENCY AND HIGH POWER DENSITY

(71) Applicant: Apple Inc., Cupertino, CA (US)

(72) Inventor: InHwan Oh, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 13/680,970

(22) Filed: Nov. 19, 2012

(65) Prior Publication Data

US 2014/0140113 A1 May 22, 2014

(51) Int. Cl.
| | |
|---|---|
| *H02M 5/45* | (2006.01) |
| *H02M 7/217* | (2006.01) |
| *H02M 1/42* | (2007.01) |
| *H02M 1/14* | (2006.01) |
| *H02M 7/48* | (2006.01) |

(52) U.S. Cl.
CPC ............ *H02M 7/217* (2013.01); *H02M 1/4241* (2013.01); *H02M 1/14* (2013.01); *H02M 2007/4818* (2013.01)

(58) Field of Classification Search
USPC ............... 323/266; 363/89, 86, 81, 82, 90, 363/125–127, 46–49, 52–53
See application file for complete search history.

(56) References Cited

U.S. PATENT DOCUMENTS

| | | | |
|---|---|---|---|
| 6,046,914 A | 4/2000 | Lauter | |
| 6,301,128 B1 * | 10/2001 | Jang et al. ................... | 363/17 |
| 7,283,379 B2 * | 10/2007 | Baker et al. ................. | 363/98 |
| 7,289,341 B2 * | 10/2007 | Hesterman .................. | 363/46 |
| 7,554,820 B2 | 6/2009 | Stanley | |
| 7,660,133 B1 | 2/2010 | Hwang et al. | |
| 7,710,088 B2 | 5/2010 | Komiya | |
| 8,576,583 B2 * | 11/2013 | Choi ........................... | 363/21.02 |
| 8,654,546 B2 | 2/2014 | Lin et al. | |
| 8,693,213 B2 | 4/2014 | Jungreis et al. | |
| 8,705,252 B2 | 4/2014 | Duvnjak | |
| 2011/0103097 A1 | 5/2011 | Wang et al. | |
| 2012/0069603 A1 | 3/2012 | Ryu et al. | |
| 2012/0250360 A1 | 10/2012 | Orr et al. | |
| 2012/0262954 A1 | 10/2012 | Duvnjak | |
| 2013/0162156 A1 * | 6/2013 | Sutardja et al. ............. | 315/201 |
| 2014/0160805 A1 * | 6/2014 | Oh et al. ..................... | 363/21.02 |

\* cited by examiner

*Primary Examiner* — Adolf Berhane
*Assistant Examiner* — Nusrat Quddus
(74) *Attorney, Agent, or Firm* — Park, Vaughan, Fleming & Dowler LLP

(57) ABSTRACT

The disclosed embodiments provide an AC/DC power converter that converts an AC input voltage into a DC output voltage. This AC/DC power converter includes an input rectifier stage which rectifies an AC input voltage into a first rectified voltage of a first constant polarity and a first amplitude. The AC/DC power converter also includes a switching resonant stage which is directly coupled to the output of the input rectifier stage. This switching resonant stage converts the rectified voltage into a second rectified voltage of a second constant polarity and a second amplitude. The AC/DC power converter additionally includes an output rectifier stage coupled to the output of the switching resonant stage, wherein the output rectifier stage rectifies the second rectified voltage into a DC voltage output.

27 Claims, 6 Drawing Sheets

AC-DC RESONANT CONVERTER THAT PROVIDES HIGH EFFICIENCY AND HIGH POWER DENSITY

BACKGROUND

1. Field

The disclosed embodiments relate to the design of AC-to-DC power converters. More specifically, the disclosed embodiments relate to designing high efficiency, high power density AC-to-DC resonant power converters.

2. Related Art

AC-to-DC (or "AC/DC") power converters are often used to convert a primary AC power source (e.g., AC power supply from a wall outlet) into a rectified DC voltage which can then be supplied to various electronic devices. Switched-mode power converters are a type of AC/DC power converter which incorporates a switching regulator to convert electrical power from AC to DC more efficiently. Power supplies which employ switched-mode power converters (often referred to as "SMPS") are commonly used in modern computing devices (e.g., both desktop and laptop computers, tablet computers, portable media players, smartphones, and/or other modern computing devices), battery chargers, and electrical vehicles, among other applications.

Power supply designers are constantly developing better AC/DC converter designs to meet the growing demand for greater efficiency, smaller size, and lighter weight. An SMPS design which uses an LLC resonant converter topology has shown remarkably high efficiency and high power density. A conventional switched-mode LLC resonant AC/DC converter typically includes a pre-regulator stage (often referred to as a "power factor correction" or "PFC stage") following an AC input rectifier. This PFC stage converts a rectified AC signal from the AC input rectifier into a DC voltage. This DC voltage is then fed into a DC/DC LLC resonant converter. However, the PFC stage uses a bulky high voltage DC capacitor to filter the rectified low frequency AC input, which can take up a substantial amount of space. Furthermore, the PFC stage typically needs to have the same power rating as the following LLC converter stage. When the power is converted using both the PFC and the LLC stages, the ability of the system to achieve high efficiency and high power density may be severely limited by the bulky high voltage DC capacitor and the PFC stage which can include many components.

Hence, what is needed is an AC/DC power converter design for an SMPS which at least eliminates the bulky DC capacitor in the PFC stage.

SUMMARY

The disclosed embodiments provide an AC/DC power converter that converts an AC input voltage to a DC output voltage. This AC/DC power converter includes an input rectifier stage which rectifies an AC input voltage into a first rectified voltage of a first constant polarity and a first amplitude. The AC/DC power converter also includes a switching resonant stage which is directly coupled to the output of the input rectifier stage. This switching resonant stage converts the rectified voltage into a second rectified voltage of a second constant polarity (which can be the same as the first constant polarity) and a second amplitude (which can be much smaller than the first amplitude). The AC/DC power converter additionally includes an output rectifier stage coupled to the output of the switching resonant stage, wherein the output rectifier stage rectifies the second rectified voltage into a DC voltage output.

In some embodiments, the AC/DC power converter further includes a controller coupled between the output of the second rectifier stage and the input of the switching resonant stage. More specifically, the controller receives the DC voltage output as a feedback signal and generates one or more control signals which drive the switching resonant stage.

In some embodiments, the AC/DC power converter does not use a pre-regulator (PFC) stage between the input rectifier stage and the switching resonant stage.

BRIEF DESCRIPTION OF THE FIGURES

In the figures, like reference numerals refer to the same figure elements.

DETAILED DESCRIPTION

The disclosed embodiments provide switched-mode resonant AC/DC power converter designs which can be used to supply DC power to computing devices (e.g., desktop computers, laptop computers, tablet computers, portable media players, smartphones, and/or other modern computing devices), battery chargers, and electrical vehicles, among other applications.

In particular embodiments, an LLC resonant AC/DC power converter which does not use a pre-regulator (PFC) stage between the input rectifier and the switching resonant stage is described. This AC/DC power converter uses a controller in a feedback loop to monitor the output voltage and to control the switching operation of the switching resonant stage. The controller is also part of a feed-forward loop, which is used to compensate for the effect of an unregulated sine-wave in the AC input voltage on the output voltage. In one embodiment, the feed-forward loop includes a lookup table which stores pre-calibrated driving frequency vs. time curves. During operation, the controller can generate a control signal with time varying frequencies based on a selected driving frequency vs. time curve. The control signal is then used to drive the switching resonant stage, wherein the time varying drive frequencies modulate the transfer function of the switching resonant stage and compensate for the effect of the unregulated sine-wave on the output voltage. By using both the feedback loop and the feed-forward loop to control the switching operation, the proposed AC/DC power converter obtains a flat DC output voltage from a high voltage sine-wave AC input voltage without the need of a PFC stage.

Figure 1:
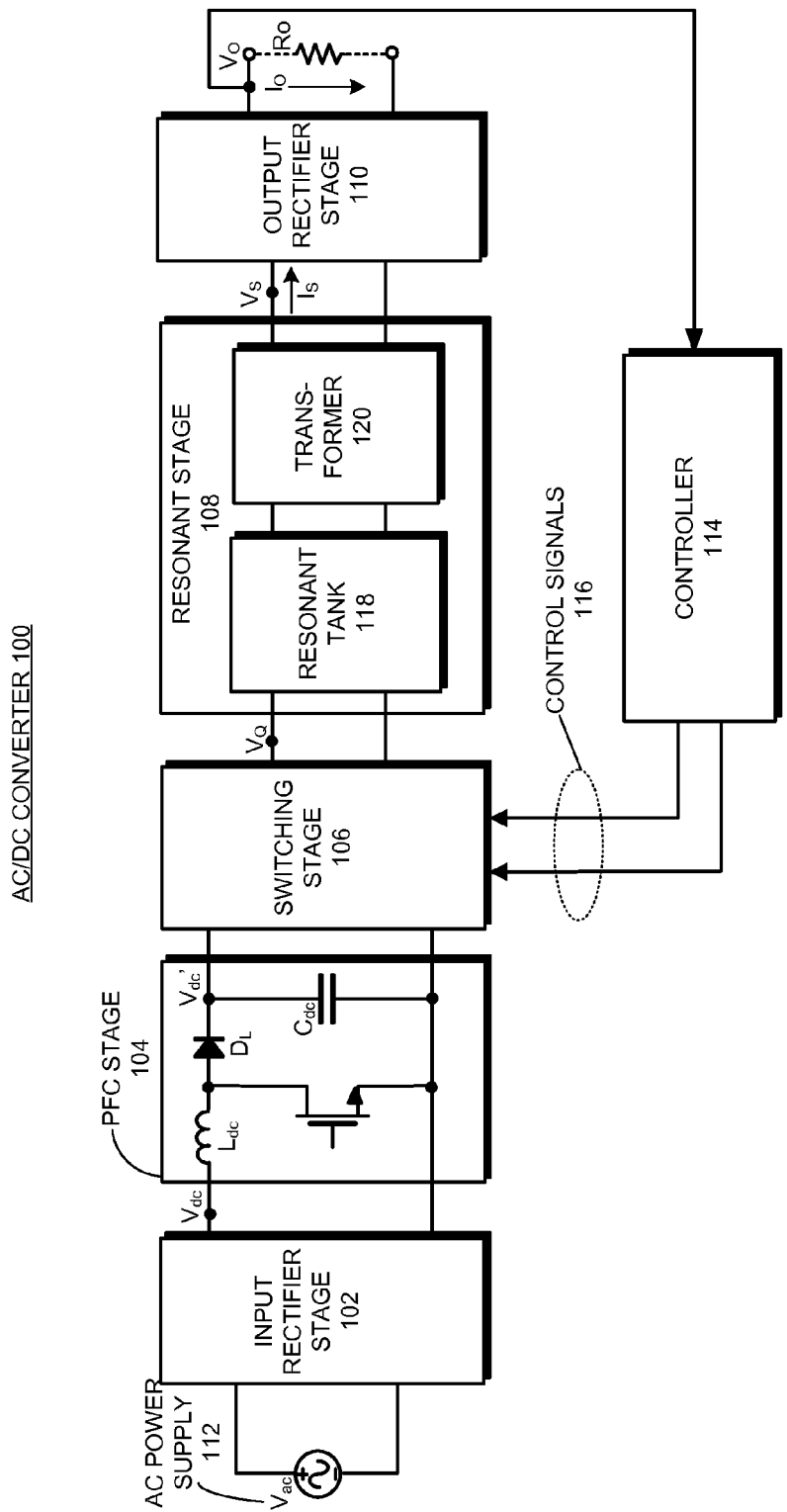
FIG. 1 illustrates a block diagram of a switched-mode resonant AC/DC power converter which converts an AC input voltage to a DC output voltage in accordance with some embodiments.

FIG. 1 illustrates a block diagram of a switched-mode resonant AC/DC power converter 100 which converts an AC input voltage to a DC output voltage in accordance with some embodiments. As is illustrated in FIG. 1, switched-mode resonant AC/DC power converter 100 ("AC/DC converter 100" hereinafter) includes an input rectifier stage 102, a pre-regulator (PFC) stage 104, a switching stage 106, a resonant stage 108, and an output rectifier stage 110. More specifically, input rectifier stage 102 is coupled to an AC power supply 112 which provides an AC input voltage $V_{ac}$ (e.g., a 50 Hz or 60 Hz utility voltage). Note that, while not shown, an electromagnetic interference (EMI) filter is typically coupled between AC power supply 112 and input rectifier stage 102. Such an EMI filter can be part of AC/DC converter 100. Input rectifier stage 102 rectifies AC voltage $V_{ac}$ into a first rectified voltage $V_{dc}$ which has a constant polarity.

Input rectifier stage 102 is coupled to PFC stage 104, which regulates rectified voltage $V_{dc}$ into a regulated DC voltage $V_{dc}'$. Note that PFC stage 104 includes a DC capacitor $C_{dc}$ and the boost inductor $L_{dc}$ which serve as a low-pass filter. To achieve a low-ripple $V_{dc}'$ output, a large size inductor $L_{dc}$ and a bulky $C_{dc}$ with a large capacitance are typically used. In the embodiment shown, PFC stage 104 additionally includes a diode $D_L$ and other circuit components. Note that PFC stage 104 can also use other regulator designs to obtain regulated DC voltage $V_{dc}'$, and therefore is not limited to the specific embodiment of FIG. 1. However, PFC stage 104 almost always includes a large DC capacitor such as $C_{dc}$.

Further referring to FIG. 1, note that the output of PFC stage 104 is coupled to switching stage 106, which converts DC voltage $V_{dc}'$ into a high frequency AC voltage $V_Q$. More specifically, switching stage 106 can include one or more switches driven by control signals 116 generated by a controller 114. In one embodiment, control signals 116 drive a pair of serially coupled switches with alternating 50% duty cycle for each switch, thereby generating square wave $V_Q$ with a 50% duty cycle. Note that controller 114 also receives an input from the output of rectifier stage 110.

Switching stage 106 is followed by resonant stage 108, which receives AC voltage $V_Q$ as input. Resonant stage 108 further comprises a resonant tank 118, and a transformer 120 which follows resonant tank 118 to step down the high input voltage $V_Q$. Resonant tank 118 can contain a serial or a parallel combination of inductors and capacitors, and many resonant tank designs can be used. Generally, resonant tank 118 is inserted after switching stage 106 to allow the switching stage to operate at zero voltage switching (ZVS) or zero current switching (ZCS) conditions. As a result, switching stage 106 can operate at high switching frequencies with very low switching losses. Next, transformer 120 generates a stepped-down AC voltage Vs and an associated AC current $I_S$ at the output of resonant stage 108.

Further referring to FIG. 1, note that resonant stage 108 is coupled to output rectifier stage 110. Output rectifier stage 110, which can be made of any conventional circuit, converts AC voltage Vs into a DC voltage $V_O$, which is also the output of AC/DC power converter 100. In the embodiment shown, DC output voltage $V_O$ and the associated DC current Is are subsequently supplied to a load $R_O$, which is typically not considered as part of AC/DC power converter 100. As mentioned above, DC voltage $V_O$ is used as feedback to controller 114. Controller 114 can generate an error based on $V_O$ and use the error to adjust control signals 116 that drive switching stage 106.

In a proposed AC/DC power converter design based on AC/DC converter 100, PFC stage 104 (including the large DC capacitor $C_{dc}$) is eliminated, thus input rectifier stage 102 and switching stage 106 are directly coupled to each other. This results in a more compact AC/DC power converter with a smaller size, higher efficiency, and higher power density. As a consequence of eliminating the PFC stage, switching stage 106 receives rectified input voltage $V_{dc}$ which contains large sinusoidal ripples. To ensure that converter output $V_O$ is substantially a constant DC voltage, a proposed embodiment redesigns controller 114 so that control signals 116 continuously vary in frequency. We now describe the proposed AC/DC power converter which does not use a PFC stage.

Figure 2:
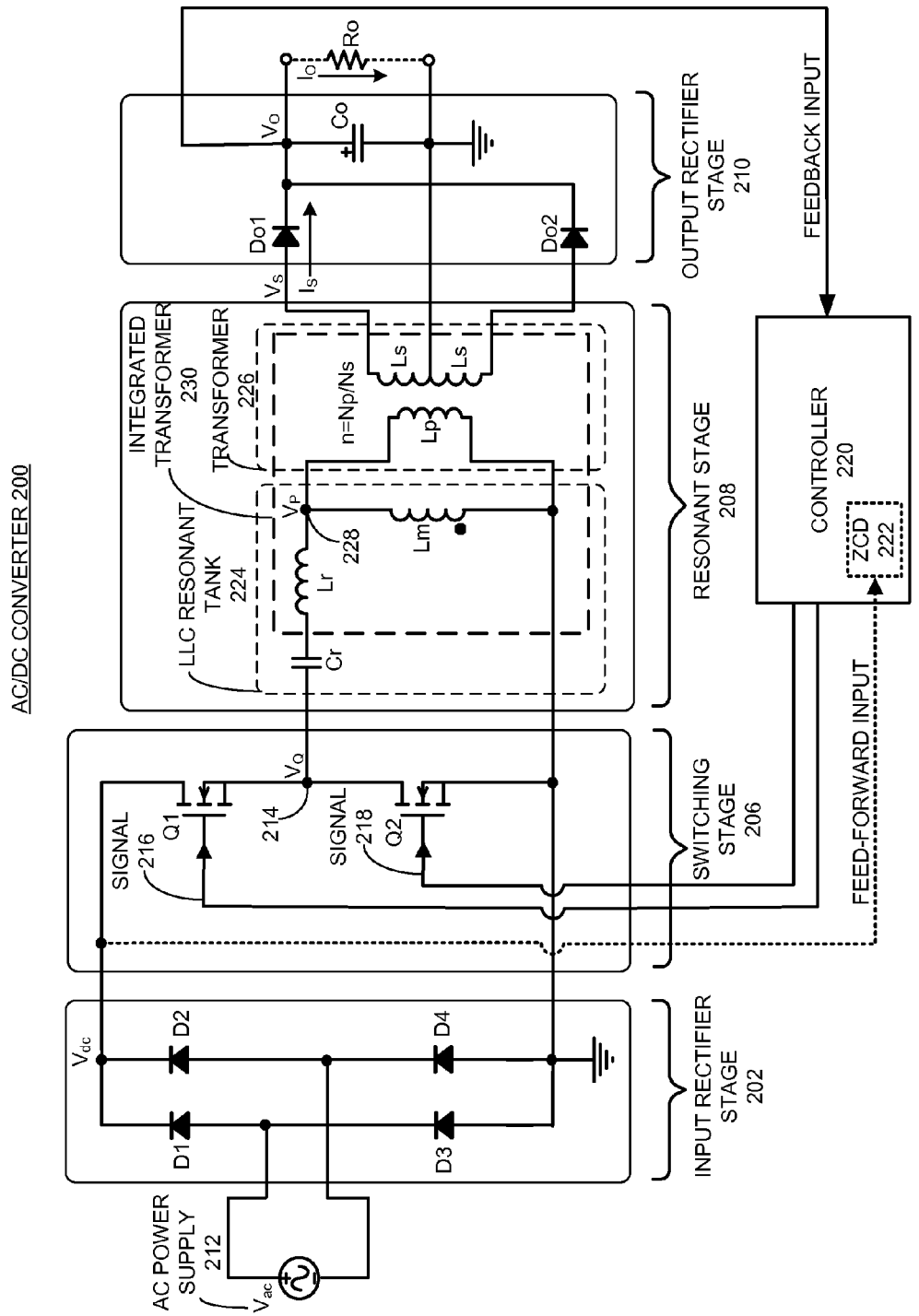
FIG. 2 illustrates a simplified switched-mode LLC resonant AC/DC power converter which converts an AC input voltage to a DC output voltage in accordance with some embodiments herein.

FIG. 2 illustrates a simplified switched-mode LLC resonant AC/DC power converter 200 which converts an AC input voltage to a DC output voltage in accordance with some embodiments herein. As is illustrated in FIG. 2, switched-mode LLC resonant AC/DC power converter 200 ("AC/DC converter 200" hereinafter) includes an input rectifier stage 202, a switching stage 206, a resonant stage 208, and an output rectifier stage 210. However, AC/DC converter 200 does not include a PFC stage similar to PFC stage 104 in AC/DC converter 100. As a result, the output of input rectifier stage 202 is directly coupled to the input of switching stage 206. By removing the PFC stage from AC/DC converter 200, the proposed embodiment also eliminates the DC capacitor $C_{dc}$. We now describe each of the remaining stages of AC/DC power converter 200 in detail.

Input rectifier stage 202 may be substantially similar to input rectifier stage 102 in AC/DC converter 100. More specifically, input rectifier stage 202 is coupled to an AC power supply 212 which provides an AC input voltage $V_{ac}$ (e.g., a 60 Hz utility voltage). In one embodiment, $V_{ac}$ has a sine waveform. In some embodiments, input rectifier stage 202 is coupled to AC power supply 212 through an AC power plug. Although not shown, an electromagnetic interference (EMI) filter is typically coupled between AC power supply 212 and input rectifier stage 202. Such an EMI filter can be part of AC/DC converter 200. Input rectifier stage 202 rectifies AC voltage $V_{ac}$ into a first rectified voltage $V_{dc}$ which has a constant polarity and large ripples having the same amplitude as $V_{ac}$. In the embodiment shown, input rectifier stage 202 uses a full-wave bridge rectifier comprising four diodes D1-D4. However, input rectifier stage 202 can use other rectifier types (e.g., a half-wave bridge rectifier) to obtain rectified voltage $V_{dc}$, and therefore is not limited to the specific embodiment of FIG. 2.

Further referring to FIG. 2, note that input rectifier stage 202 is directly coupled to switching stage 206, which converts low frequency rectified voltage $V_{dc}$ into a high frequency AC voltage $V_Q$ at node 214. Switching stage 206 may be substantially similar to switching stage 106 in AC/DC converter 100. In the embodiment shown, switching stage 206 uses a pair of serially coupled MOSFETs Q1 and Q2 as switches, wherein Q1 and Q2 are driven by control signals 216 and 218 coupled to the gate of the respective MOSFET. However, switching stage 206 can also use other switching circuits or techniques to obtain high frequency AC voltage $V_Q$, and therefore is not limited to the specific embodiment of FIG. 2. For example, instead of using two MOSFET switches, switching stage 206 can use a single MOSFET switch driven by a single control signal. Note that control signals 216 and 218 are generated by a controller 220 which is coupled between the inputs of switching stage 206 and the output of output rectifier stage 210. In some embodiments, controller 220 is used in a feedback loop which adjusts control signals 216 and 218 so that rectifier stage 210 output is a substantially regulated DC voltage against the AC input voltage and load variations.

Note that controller 220 can receive $V_{dc}$ as a feed-forward input, and then use a zero-cross detector (ZCD) 222 to detect zero crossings within $V_{dc}$. This timing information can be used by controller 220 to synchronize control signals 216 and 218 to input voltage $V_{dc}$. Note that while ZCD 222 is shown as a module within controller 220, other embodiments can use a discrete ZCD outside controller 220 to receive $V_{dc}$, and generate timing information as output which is then fed to controller 220. In some embodiments, however, neither an integrated ZCD nor a discrete ZCD is used in AC/DC converter 200, and controller 220 identifies the zero crossings in $V_{dc}$ using other techniques. We describe an exemplary design of controller 220 in more detail below in conjunction with FIG. 4.

Further referring to FIG. 2, note that switching stage 206 is followed by resonant stage 208, which receives high amplitude AC voltage $V_Q$ as input. Resonant stage 208 may be substantially similar to resonant stage 108 in AC/DC converter 100. More specifically, resonant stage 208 further comprises an LLC resonant tank 224, and a transformer 226 which follows LLC resonant tank 224 to step down the high input voltage $V_Q$. More superficially, LLC resonant tank 224 comprises two inductors Lr (often referred to as a "leakage inductor") and Lm (often referred to as a "magnetizing inductor"), and one capacitor Cr. Note that LLC resonant tank 224 typically has two resonant frequencies. Note also that transformer 226 (and the rest of AC/DC converter 200) is connected in parallel to the inductor Lm.

As mentioned above, a resonant tank is generally inserted after the switching stage to allow the switching stage to operate at zero voltage switching (ZVS) or zero current switching (ZCS) conditions. LLC resonant tank 224 has a number of advantages over many other resonant tank configurations. For example, an LLC resonant converter can operate under ZVS condition over a wide range of load, even under no load, conditions. Moreover, an LLC resonant converter can operate within a narrow frequency variation range over a wide load range. Note that resonant stage 208 can use other resonant tank configurations, such as a simple serial resonant tank, a simple parallel resonant tank, or other combinations of two or three inductors and capacitors. Hence, the resonant tank in resonant stage 208 is not limited to the specific embodiment illustrated in FIG. 2.

LLC resonant tank 224 generates an intermediate AC voltage $V_P$ at node 228. Next, transformer 226 generates a stepped-down AC voltage Vs and an associated AC current $I_S$ at the output of resonant stage 208. Note that transformer 226 is configured to have an input to output turns ratio of n=Np/Ns, wherein Np and Ns are the number of turns of transformer coils on the primary side and the secondary side, respectively. Note that leakage inductor Lr and magnetizing inductor Lm can be discrete components, or can be integrated into transformer 226. In the embodiment shown in FIG. 2, both inductors Lr and Lm are integrated with transformer 226 as part of an integrated transformer 230.

Note that resonant stage 208 is coupled to output rectifier stage 210. Output rectifier stage 210, which is substantially similar to output rectifier stage 110 in AC/DC converter 100, converts AC voltage Vs into a DC voltage $V_o$, which is also the output of AC/DC converter 200. In the embodiment shown, output rectifier stage 210 includes a full-wave rectifier comprising two diodes Do1 and Do2, a center-tapped transformer, and a low-pass filter Co. Rectified voltage Vo and the associated DC current Is are subsequently supplied to a load $R_o$, which is typically not considered as part of AC/DC converter 200. As mentioned above, the rectified voltage $V_O$ is used as a feedback signal to controller 220. Controller 220 can generate an error based on $V_O$ and use the error to adjust control signals 216 and 218 until the output voltage $V_O$ is a substantially DC signal.

Compared with AC/DC converter 100, AC/DC converter 200 provides a simpler, more compact and more efficient converter design. However, by removing the PFC stage, input to the switching stage is a rectified sine-wave with a low frequency (assuming AC power supply has a sine waveform). The sine-wave modulated voltage is then propagated to $V_Q$ and $V_P$. If a conventional output rectifier stage 210 is used, the output $V_O$ will also be modulated by the low-frequency sine-wave, which is not desirable. We now describe how controller 220 can be configured to compensate for the sine-wave modulation in the converter output $V_O$.

We first compute output voltage gain $G=V_P/V_Q$ (i.e., "the transfer function") of resonant stage 208. Note that in LLC resonant tank 224, serially coupled Cr and Lr are in series with Lm, which is in parallel to the rest of AC/DC converter 200. To compute voltage gain of $V_P$ at node 228 to $V_Q$ at node 218, we use voltage divider theory to get:

$$G(\omega) = \left| \frac{jX_{Lm} \mathbin{/\mkern-6mu/} R_{eq}}{(jX_{Lm} \mathbin{/\mkern-6mu/} R_{eq}) + j(X_{Lr} - X_{Cr})} \right|,$$

wherein ω is the driving frequency of control signals 216 and 218; $X_{Lm}$, $X_{Lr}$, and $X_{Cr}$ are the reactance of inductors Lm and Lr, and capacitor Cr, respectively; and $R_{eq}$ is the equivalent impedance of the rest of AC/DC converter 200 in parallel with Lm. $R_{eq}$ may be expressed as:

$$R_{eq}(n) = 8\frac{n^2}{\pi^2}R_o,$$

wherein n is the turns ratio Np/Ns, and $R_o$ is the impendence of the load.

Note that $X_{Lm}(\omega)=\omega L_m$, $X_{Lr}(\omega)=\omega L_r$, and $$X_{Cr}(\omega) = \frac{1}{\omega C_r}$$

are all functions of the driving frequency $f=\omega/(2\pi)$. Hence, output voltage gain G is also a function of the driving frequency. We observe that if f is fixed in time, G(f) is also fixed. If the AC input $V_{ac}$ can be expressed as $V_{ac}=V_{pk}\sin(wt)$, then $V_Q$ includes a sine-wave modulation proportional |sin(wt)|, wherein w is the frequency of the AC input $V_{ac}$. The sine-wave modulation is propagated from $V_Q$ to $V_P$, and then to Vs, and ultimately presents in output voltage Vo. Note that in order to obtain a flat output voltage Vo, this sine-wave modulation on Vo needs to be compensated.

In one embodiment, this compensation can be achieved by varying driving frequency f with time t over each period of the half sine-wave |sin(wt)|. More specifically, when the value of Vo corresponds to a larger value in the sine-wave, we design f such that G(f) has a lower value; and when the value of Vo corresponds to a lower value in the sine-wave, we design f such that G(f) has a higher value. Hence, over each |sin(wt)| period, driving frequency f and hence G(f) are continuously varied with time t. In one embodiment, we can configure f(t) over each |sin(wt)| period so that the product of sin(wt) and G(f(t)) is near constant.

Figure 3:
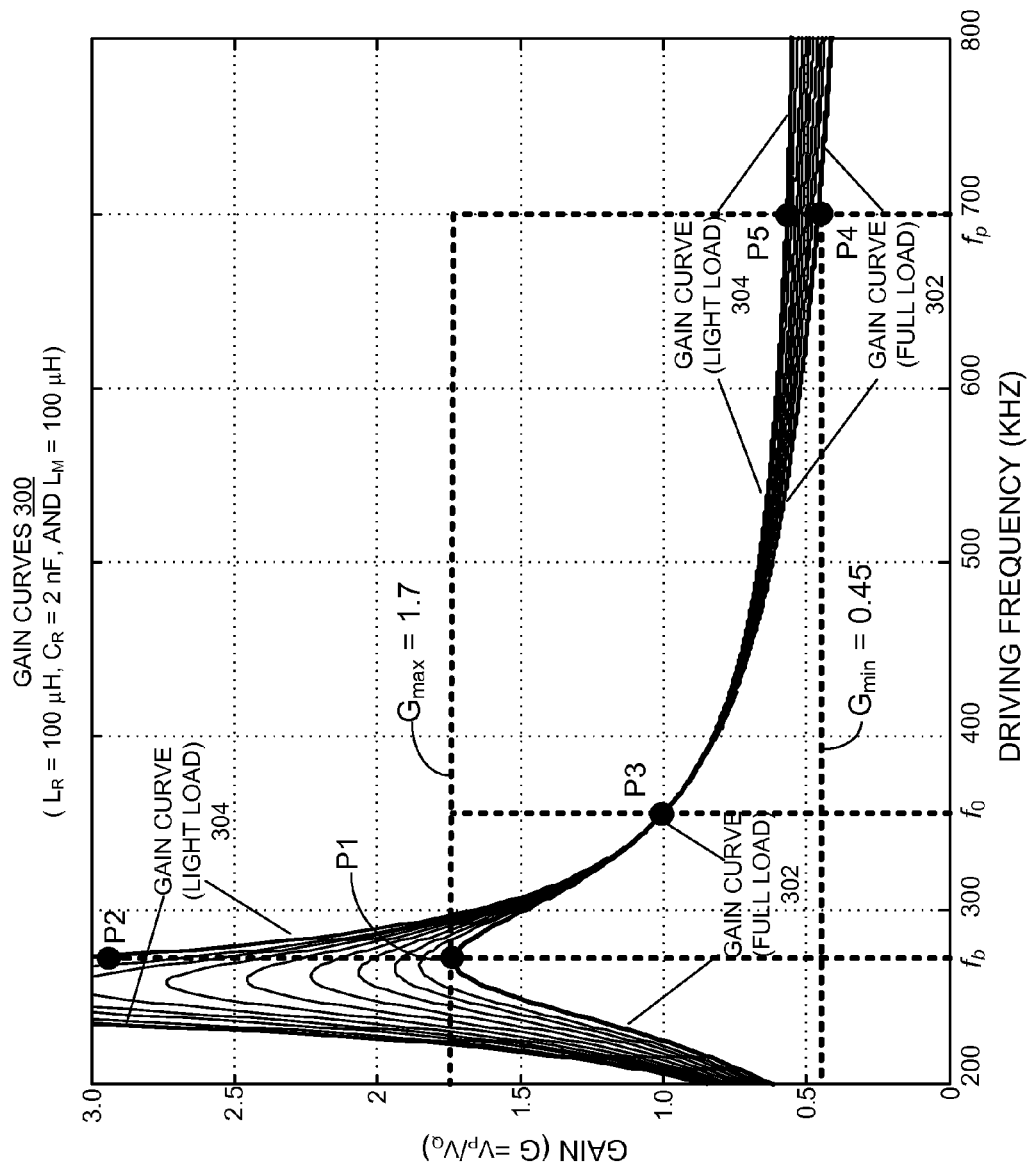
FIG. 3 illustrates gain vs. driving frequency curves for a given LLC resonant converter design in accordance with some embodiments herein.

FIG. 3 illustrates gain vs. driving frequency curves (gain curves) 300 for a given LLC resonant converter design in accordance with some embodiments herein. More specifically, FIG. 3 illustrates a group of characteristic gain ($G=V_P/V_Q$) vs. driving frequency (f) curves (or "gain curves") measured for an LLC resonant converter at different load conditions, wherein the LLC resonant tank has the following values: Lr=100 µH, Cr=2 nF, and Lm=100 µH.

Note that among the group of gain curves, gain curve 302, which was measured under a full load condition, is the lowest curve on the plot among the group of curves. There are three characteristic points shown on gain curve 302: P1, P3, and P4. P1 is where gain curve 302 reaches the maximum gain $G_{max}=1.7$ at a driving frequency $f_b \approx 270$ kHz. P3 corresponds to one of two resonant frequencies $f_0$ of the LLC resonant tank. Note that the group of gain curves at different load conditions intersects at P3 which corresponds to a unit gain. P4 corresponds to a minimum gain $G_{min}=0.45$ on gain curve 302 at a driving frequency $f_p \approx 700$ kHz. Note that between drive frequencies $f_b$ and $f_p$, voltage gain G(f) monotonically decreases as driving frequency f increases from $f_b$ to $f_p$. In other words, G(f) associated with gain curve 302 is an inverse function of driving frequency f between $f_b$ and $f_p$.

FIG. 3 also illustrates gain curve 304 corresponding to a light load condition, which is the tallest curve among the group of curves. There are three characteristic points shown on gain curve 304: P2, P3, and P5. P2 is a point on gain curve 304 corresponding to the driving frequency $f_b \approx 270$ kHz where gain curve 302 achieves the maximum gain. Note that P2 corresponds to a gain on gain curve 304 which is significantly greater than $G_{max}$. P3 on gain curve 304 is the same P3 on gain curve 302. P5 is a point on gain curve 304 corresponding to driving frequency $f_p \approx 700$ kHz where gain curve 304 has a low gain $G_{min}=0.55$. Note that G(f) associated with gain curve 304 is also an inverse function of driving frequency f between $f_b$ and $f_p$.

FIG. 3 also illustrates additional gain curves which were calibrated for other load conditions in between the full load and the light load. These gain curves fall between gain curves 302 and 304. Within each of these curves, an inverse region between driving frequency f and G(f) can also be identified. Based on the inverse property of the gain curves, we can design a driving frequency curve to compensate for the effect of sine-wave ripple on the output voltage Vo. However, due to the nonlinear nature of the inverse region in the gain curves, this driving frequency curve needs to be calibrated for each input voltage $V_{dc}$.

Figure 4B:
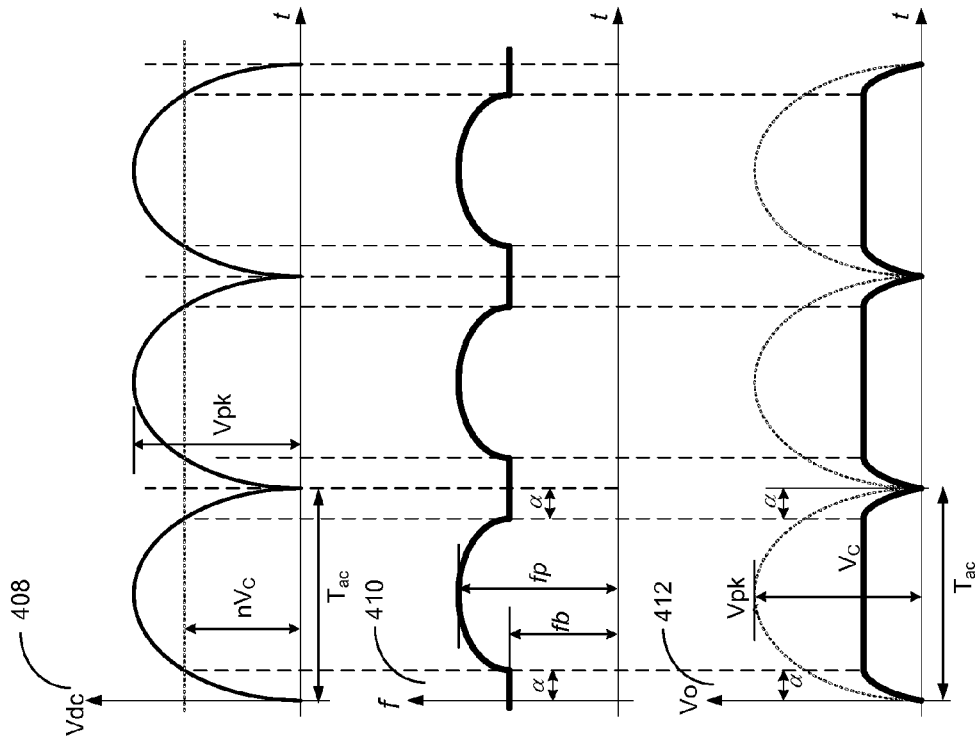
FIG. 4B illustrates a process for determining a driving frequency curve which includes constant driving frequency regions in accordance with some embodiments herein.
Figure 4A:
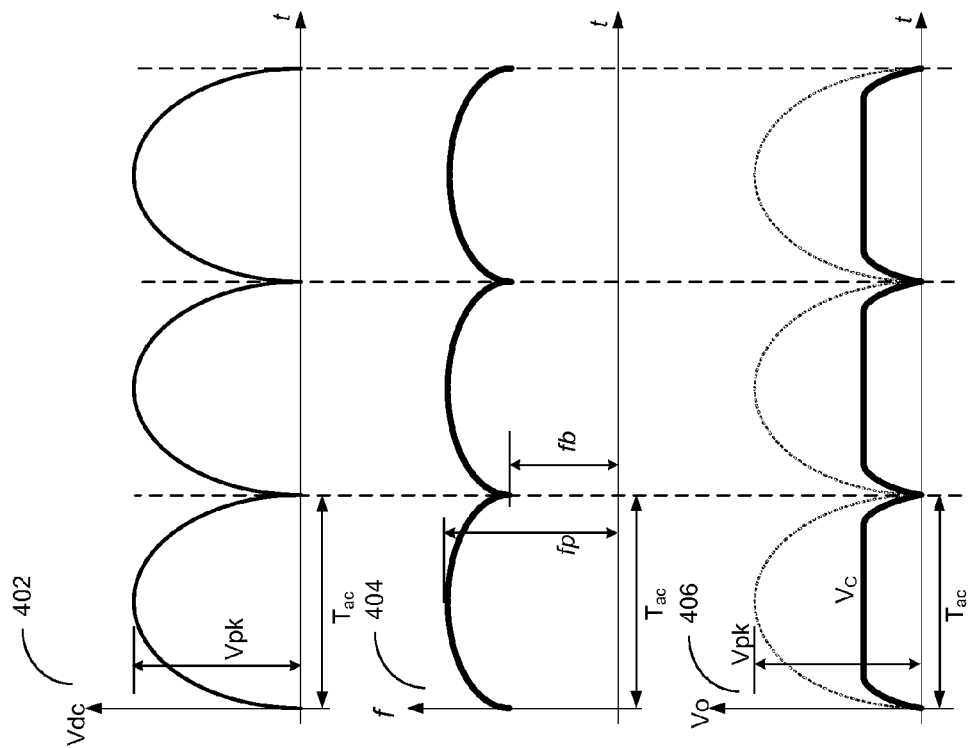
FIG. 4A illustrates a process for determining a driving frequency curve over |sin(wt)| period for a given LLC resonant converter in accordance with some embodiments herein.

FIG. 4A illustrates a process for determining a driving frequency curve over a |sin(wt)| period for a given LLC resonant converter in accordance with some embodiments herein. Without losing generality, FIG. 4A is described in the context of FIG. 2 and FIG. 3.

Note that FIG. 4A comprises three subplots. The top subplot 402 illustrates the rectified voltage $V_{dc}$ at the output of input rectifier stage 202 as a function of time. More specifically, subplot 402 includes three periods ($3 \times T_{ac}$) of sine-waves of the same polarity and a peak amplitude $V_{pk}$. The problem is to find driving frequency f which controls gain curve G(f) so that AC/DC converter output Vo is substantially a constant DC voltage.

The middle subplot 404 illustrates the driving frequency f as a function of time over the same time period as subplot 402. Note that within each period $T_{ac}$, driving frequency f varies between a base frequency $f_b$ which corresponds to the zero positions in $V_{dc}$, and a peak frequency $f_p$ which corresponds to the peak voltage $V_{pk}$ in $V_{dc}$. In one embodiment, frequencies $f_b$ and $f_p$ are first determined based on gain curve 302 for the full load condition of the AC/DC converter in FIG. 3, wherein $f_b$ and $f_p$ are associated with the maximum gain $G_{max}$ and the minimum gain $G_{min}$ in gain curve 302. Once peak frequency $f_p$ and base frequency $f_b$ are determined, driving frequency f is varied between $f_b$ and $f_p$ based on the amplitude of $V_{dc}$, the gain curve G(f), and the objective to keep Vo a constant value. In one embodiment, driving frequency f has a range which falls between 200 kHz and 1 MHz.

In one embodiment, Vo corresponding to $V_{dc}=V_{pk}$ can be computed using the gain associated with $f_p$: $V_c=V_{pk} \cdot G_{min}/n$, wherein n is the turns ratio of the transformer. After Vo corresponding to the peak voltage is determined, the system can generate a driving frequency for each $V_{dc}$ value between 0 and $V_{pk}$ based on the selected gain curve G(f). For example, when $V_{dc}=0.75V_{pk}$, the system determines that $G(f)=G_{min}/0.75$ will produce the same constant output $V_c=V_{pk} \cdot G_{min}/n$. Next, the system can identify the driving frequency f from gain curve 302 between $f_b$ and $f_p$ that corresponds to gain value of $G_{min}/0.75$. In this manner, the full driving frequency curve f(t) can be constructed. Note that due to the symmetry, the system only needs to calibrate one half period of driving frequency f, which is then mirrored to obtain driving frequency values for a full period $T_{ac}$ (also referred to as a "driving frequency curve"). The calibrated driving frequency curve is then repeated to obtain frequency waveform of subplot 404. In one embodiment, the calibrated driving frequency curve of subplot 404 is stored in a lookup table which can be used by controller 220 to generate control signals 216 and 218. We describe a more detailed embodiment of controller 220 which uses such a lookup table in conjunction with FIG. 5.

The bottom subplot 406 in FIG. 4A illustrates output voltage Vo as a function of time over the same time period as subplot 404. Ideally, the above described output compensation technique will produce a flat DC output Vo substantially equal to $V_{pk} \cdot G_{min}/n$. However, because the maximum gain of gain curve 302 is limited to $G_{max}$ while $V_{dc}$ drops to a very low level on either end of the sine-wave, at some point $Vo=V_{dc} \times G(f)$ will roll off from the desired constant level toward zero. It can be seen that within each period $T_{ac}$, Vo includes a flat region in the middle of the waveform. However, near 0 and 180° phase angles, Vo dips toward zero which creates "valleys" in the output waveform. In one embodiment, these defects in Vo can be filtered out or reduced using a DC output capacitor. However, due to the low frequency nature of these defects, a very large capacitance would be required for this operation.

FIG. 4B illustrates a process for determining a driving frequency curve which includes constant driving frequency regions in accordance with some embodiments herein.

The top subplot 408 in FIG. 4B illustrates the same rectified voltage $V_{dc}$ as subplot 402 in FIG. 4A. The middle subplot 410 illustrates the driving frequency f as a function of time over the same time period as subplot 408. Similarly to subplot 404 in FIG. 4A, driving frequency f in subplot 410 varies between base frequency $f_b$ which corresponds to the zero positions in $V_{dc}$, and peak frequency $f_p$ which corresponds to the peak voltage $V_{pk}$ in $V_{dc}$. However, the base frequency $f_b$ is maintained from zero positions until positions defined by a distance α from the zero positions. Note that these two flat regions in the driving frequency curve define two constant gain regions with the maximum gain $G_{max}$. When the drive curve including these high gain regions is applied to input voltage $V_{dc}$, the high gain regions allow the flat region in the output voltage Vo to be more broadened, as is shown in the bottom subplot 412 in FIG. 4B. In one embodiment, the substantially constant Vo can be obtained between the two high gain regions.

Note that different techniques may be used to calibrate the α value. In one embodiment, α value is determined using the feedback loop described in conjunction with FIG. 2. More specifically, α value may be initialized from 0 and gradually increased, and for each new α value, Vo corresponding to f(α) is compared to a predetermined level (programmed inside controller 220). When Vo corresponding to f(α) increases to the predetermined level, α value is set and recorded. In another embodiment, after the constant output $V_c = V_{pk} \cdot G_{min}/n$ is computed, a constant voltage level $nV_c = V_{pk} \cdot G_{min}$ is compared with $V_{dc}$ in subplot 408, and α value is determined from the intersections of $nV_c$ and $V_{dc}$.

Figure 5:
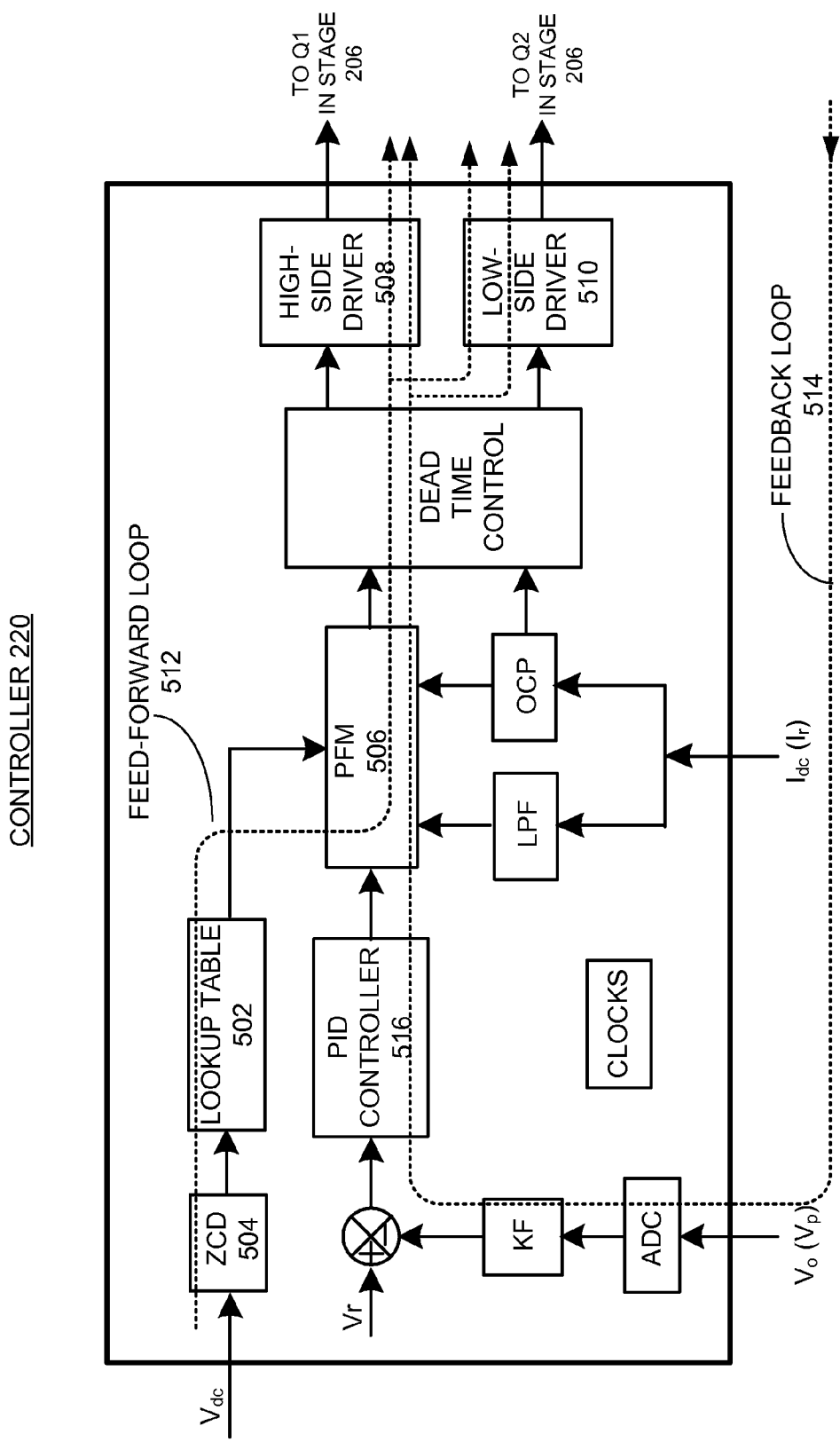
FIG. 5 illustrates a block diagram of controller 220 within AC/DC converter 200 in accordance with some embodiments herein.

FIG. 5 illustrates a block diagram of controller 220 within AC/DC converter 200 in accordance with some embodiments herein. As is illustrated in FIG. 5, controller 220 includes a lookup table 502. In one embodiment, lookup table 502 stores one or more calibrated driving frequency curves (i.e., driving frequency vs. time curves). Note that detailed operations for constructing driving frequency curves have been described above in conjunction with FIG. 4A and FIG. 4B. A driving frequency curve in lookup table 502 may correspond to a unique LLC converter design. Moreover, different driving frequency curves may be associated with the same LLC converter design but different $V_{dc}$ inputs. For example, different driving frequency curves may be generated for different input waveforms (note that the input waveform is not limited to sine-waves, e.g., it can also include triangular waves and square waves, among others). Hence, during operation, the system can select a driving frequency curve from lookup table 502 based on the specific LLC converter design and input voltage $V_{dc}$.

In the embodiment shown, controller 220 also includes a zero-cross detector (ZCD) 504 which receives $V_{dc}$ as a feed-forward input and detects zero crossings within $V_{dc}$. This phase information is then used by controller 220 to synchronize the selected driving frequency curve with the $V_{dc}$ input. The time-synchronized values of the selected driving frequency curve are fed into pulse frequency modulator (PFM) 506. PFM 506 is configured to generate frequency modulated pulse signals based on the selected driving frequency curve, wherein the frequency modulated pulse signals are used by a high-side driver 508 and a low-side driver 510 to generate the two control signals 216 and 218 for the two switches Q1 and Q2. Note that lookup table 502, ZCD 504, PFM 506 and drivers 508 and 510 form a feed-forward loop 512 for compensating for the effect of $V_{dc}$ and generating a flat output voltage Vo from AC/DC converter 200.

As described above, controller 220 is also part of a feedback loop 514 in AC/DC converter 200 to keep the output voltage Vo constant. In one embodiment, the active feedback to controller 220 is obtained from Vo as was described in conjunction with FIG. 2. In another embodiment, the active feedback to controller 220 may be taken from $V_P$ at the primary side of the transformer 226, for example, by using the transformer auxiliary winding. In one embodiment, feedback loop 514 is used to detect fluctuations in Vo. A proportional-integral-derivative (PID) controller 516 in controller 220 is used to generate an error signal between Vo or $V_P$ and a reference signal $V_r$, which is then fed into PFM 506. PFM 506 uses this error signal to adjust the frequency modulated pulse signals to compensate for the errors.

In one embodiment, PID controller 516 may be used to detect a change in Vo caused by a sudden change of load condition Ro. Recall that gain curves 300 in FIG. 3 illustrate that different load conditions can have very different gains at the same driving frequency. In one embodiment, if a load condition change has been detected by PID controller 516, PFM 506 can offset one of base frequency $f_b$ and peak frequency $f_p$, or both frequencies to compensate for this change, thereby maintaining Vo levels.

In some embodiments, ZCD 504 and $V_{dc}$ input may be eliminated from controller 220. In these embodiments, controller 220 uses the phase information extracted from feedback input Vo or $V_P$ to synchronize the selected lookup table with $V_{dc}$. These embodiments may result in a more compact controller design than the embodiment shown in FIG. 5.

Figure 6:
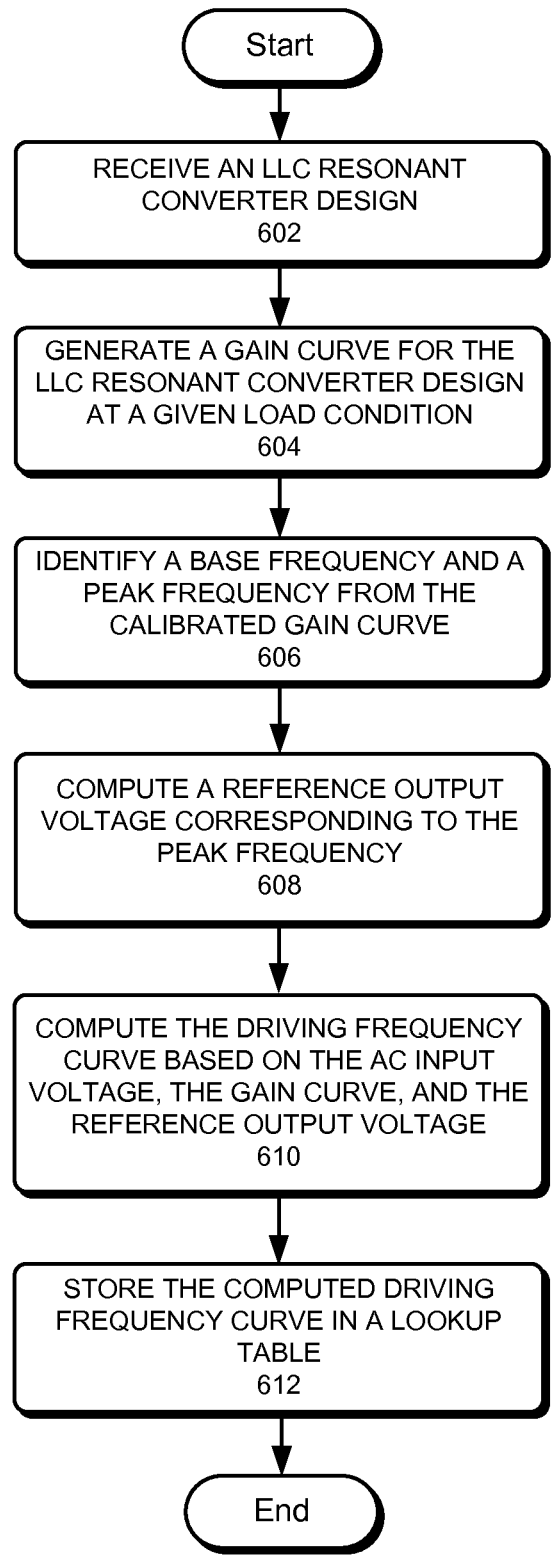
FIG. 6 presents a flowchart illustrating the process of constructing a driving frequency curve for the lookup table in accordance with some embodiments herein.

FIG. 6 presents a flowchart illustrating the process of constructing a driving frequency curve for the lookup table in accordance with some embodiments herein. In one or more embodiments, one or more of the steps may be omitted, repeated, and/or performed in a different order. Accordingly, the specific arrangement of steps shown in FIG. 6 should not be construed as limiting the scope of the embodiments.

During operation, the system receives an LLC resonant converter design (step 602). Note that, for the given design, Lr, Cr, and Lm have fixed values. The system then generates a gain curve for the LLC resonant converter design at a given load condition (step 604). In one embodiment, the gain curve is obtained by measuring the characteristic gain ($G = V_P/V_Q$) of the LLC resonant converter design as a function of frequency. In one embodiment, the given load condition is a full load condition.

Next, the system identifies a base frequency and a peak frequency from the calibrated gain curve (step 606). In one embodiment, the gain curve between the identified base frequency and peak frequency monotonically decreases. The system then computes a reference output voltage corresponding to the peak frequency (step 608). In one embodiment, the system computes the reference output voltage by multiplying the peak amplitude of an AC input voltage with the characteristic gain associated with the peak frequency. Next, the system computes the driving frequency curve based on the AC input voltage, the calibrated gain curve, and the reference output voltage (step 610) and subsequently stores the computed driving frequency curve in a lookup table (step 612).

The preceding description was presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein. Accordingly, many modifications and variations will be apparent to practitioners skilled in the art. Additionally, the above disclosure is not intended to limit the present description. The scope of the present description is defined by the appended claims.

Also, some of the above-described methods and processes can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and apparatus described can be included in, but are not limited to, application-specific integrated circuit (ASIC) chips, field-programmable gate arrays (FPGAs), and other programmable-logic devices.

What is claimed is:

1. An AC/DC power converter for converting an AC input voltage into a DC output voltage, comprising:
   an input rectifier stage which rectifies an AC input voltage into a first rectified voltage of a first constant polarity and a first amplitude;
   a switching resonant stage directly coupled to the output of the input rectifier stage, wherein the switching resonant stage comprises:
      a switching stage comprising one or more switches, wherein the switching frequency of the one or more switches varies as a function of the AC input voltage; and
      a resonant stage, which is coupled to the output of the switching stage that converts the switching stage's output voltage into a second rectified voltage of a second constant polarity and a second amplitude; and
   an output rectifier stage coupled to the output of the switching resonant stage, wherein the output rectifier stage rectifies the second rectified voltage into a DC voltage output.

2. The AC/DC power converter of claim 1, wherein the resonant stage further comprises:
   an LLC resonant tank which comprises two inductors and a single capacitor; and
   a transformer coupled to the output of the LLC resonant tank and configured to down-convert the first amplitude into the second amplitude.

3. The AC/DC power converter of claim 2, wherein one or both of the two inductors is integrated with the transformer to form an integrated transformer.

4. The AC/DC power converter of claim 1, further comprising a controller coupled between the output of the second rectifier stage and the input of the switching resonant stage, wherein the controller receives the DC voltage output as a feedback signal and generates one or more control signals which drive the switching resonant stage.

5. The AC/DC power converter of claim 4, wherein the one or more switches are controlled by the one or more control signals.

6. The AC/DC power converter of claim 4, wherein the controller includes a feed-forward synchronization module which is configured to synchronize the one or more control signals with the first rectified voltage.

7. The AC/DC power converter of claim 6, wherein the feed-forward synchronization module includes a zero cross detector (ZCD) which detects phase information within the first rectified voltage.

8. The AC/DC power converter of claim 6, wherein the controller is configured to couple the first rectified voltage into the feed-forward synchronization module.

9. The AC/DC power converter of claim 6, wherein the feed-forward synchronization module further comprises a lookup table which stores a plurality of pre-calibrated driving frequency versus time curves.

10. The AC/DC power converter of claim 9, wherein the lookup table is coupled to the output of the ZCD, and wherein the lookup table uses the phase information from the ZCD to synchronize the first rectified voltage with the driving frequency versus time curves.

11. The AC/DC power converter of claim 9, wherein the controller further comprises a pulse frequency modulation (PFM) module coupled to the feed-forward synchronization module and configured to generate the one or more control signals based on one of the pre-calibrated driving frequency versus time curves.

12. The AC/DC power converter of claim 11, wherein each of the one or more control signals is a frequency modulated pulse signal.

13. The AC/DC power converter of claim 1, wherein the AC/DC power converter does not use a pre-regulator (PFC) stage between the input rectifier stage and the switching resonant stage.

14. A power supply, comprising:
   an AC power connector; and
   an AC/DC power converter coupled to the AC power connector and configured to convert an AC input voltage to a DC output voltage;
   wherein the AC/DC power converter further comprises:
      an input rectifier stage which rectifies an AC input voltage into a first rectified voltage of a first constant polarity and a first amplitude;
      a switching resonant stage directly coupled to the output of the input rectifier stage, wherein the switching resonant stage comprises:
         a switching stage comprising one or more switches, wherein the switching frequency of the one or more switches varies as a function of the AC input voltage; and
         a resonant stage, which is coupled to the output of the switching stage that converts the switching stage's output voltage into a second rectified voltage of a second constant polarity and a second amplitude; and
      an output rectifier stage coupled to the output of the switching resonant stage, wherein the output rectifier stage rectifies the second rectified voltage into a DC voltage output.

15. The power supply of claim 14, wherein the resonant stage further comprises:
   an LLC resonant tank which comprises two inductors and a single capacitor; and
   a transformer coupled to the output of the LLC resonant tank and configured to down-convert the first amplitude into the second amplitude.

16. The power supply of claim 15, wherein one or both of the two inductors are integrated with the transformer to form an integrated transformer.

17. The power supply of claim 14, wherein the AC/DC power converter further comprises a controller coupled between the output of the second rectifier stage and the input of the switching resonant stage, wherein the controller receives the DC voltage output as a feedback signal and generates one or more control signals which drive the switching resonant stage.

18. The power supply of claim 17, wherein the one or more switches are controlled by the one or more control signals.

19. The power supply of claim 17, wherein the controller includes a feed-forward synchronization module which is configured to synchronize the one or more control signals with the first rectified voltage.

20. The power supply of claim 19, wherein the feed-forward synchronization module includes a zero cross detector (ZCD) which detects phase information within the first rectified voltage.

21. The power supply of claim 19, wherein the controller is configured to couple the first rectified voltage into the feed-forward synchronization module.

22. The power supply of claim 19, wherein the feed-forward synchronization module further comprises a lookup table which stores a plurality of pre-calibrated driving frequency versus time curves.

23. The power supply of claim 22, wherein the lookup table is coupled to the output of the ZCD, and wherein the lookup table uses the phase information from the ZCD to synchronize the first rectified voltage with the driving frequency versus time curves.

24. The power supply of claim 22, wherein the controller further comprises a pulse frequency modulation (PFM) module coupled to the feed-forward synchronization module and configured to generate the one or more control signals based on one of the pre-calibrated driving frequency versus time curves.

25. The power supply of claim 24, wherein each of the one or more control signals is a frequency modulated pulse signal.

26. The power supply of claim 14, wherein the AC/DC power converter does not use a pre-regulator (PFC) stage between the input rectifier stage and the switching resonant stage.

27. A system that converts an AC input voltage into a DC output voltage, comprising:

an input rectifier stage which rectifies an AC input voltage into a first rectified voltage of a first constant polarity and a first amplitude;

a switching resonant stage directly coupled to the output of the input rectifier stage, wherein the switching resonant stage comprises:
   a switching stage comprising one or more switches, wherein the switching frequency of the one or more switches varies as a function of the AC input voltage; and
   a resonant stage, which is coupled to the output of the switching stage that converts the switching stage's output voltage into a second rectified voltage of a second constant polarity and a second amplitude; and an output rectifier stage coupled to the output of the switching resonant stage, wherein the output rectifier stage rectifies the second rectified voltage into a DC voltage output.

* * * * *